United States Patent
Shafer

(10) Patent No.: US 10,478,845 B1
(45) Date of Patent: Nov. 19, 2019

(54) REMOTELY ACTIVATED DISPENSER

(71) Applicant: Delaware Capital Formation, Inc., Wilmington, DE (US)

(72) Inventor: Glen Shafer, Amelia, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 16/059,355

(22) Filed: Aug. 9, 2018

(51) Int. Cl.
*B05B 12/00* (2018.01)
*B05B 7/30* (2006.01)
*F16K 31/46* (2006.01)

(52) U.S. Cl.
CPC .............. *B05B 12/002* (2013.01); *B05B 7/30* (2013.01); *F16K 31/46* (2013.01)

(58) Field of Classification Search
CPC .......... B05B 12/002; B05B 7/30; F16K 31/46
See application file for complete search history.

(56) References Cited

U.S. PATENT DOCUMENTS

| | | |
|---|---|---|
| 1,158,079 A | 10/1915 | Saunders |
| 1,241,437 A | 9/1917 | Pain |
| 1,745,972 A | 2/1930 | Beck |
| 2,753,664 A | 7/1956 | Garver |
| 3,139,238 A | 6/1964 | Norstrud |
| 3,369,705 A | 2/1968 | Curtis |
| 4,262,822 A | 4/1981 | Corte |
| 4,457,472 A | 7/1984 | Geberth, Jr. |
| 4,588,318 A | 5/1986 | O'Brien et al. |
| 4,651,930 A | 3/1987 | Magaha, Jr. |
| 4,722,460 A | 2/1988 | Madsen |
| 4,729,135 A | 3/1988 | Titterington |
| 4,856,756 A | 8/1989 | Combs |
| 4,926,514 A | 5/1990 | Leuenberger |
| 5,462,254 A | 10/1995 | Muller |
| 6,299,035 B1 | 10/2001 | Dalhart |
| 7,331,488 B2 * | 2/2008 | Naslund ............ F16K 31/52416 134/100.1 |
| 7,516,763 B2 * | 4/2009 | Bertucci ............... B01F 3/0865 141/104 |

* cited by examiner

*Primary Examiner* — Frederick C Nicolas
(74) *Attorney, Agent, or Firm* — Wood Herron & Evans LLP

(57) ABSTRACT

A remote activation dispenser for dispensing fluids. An actuating device positioned on a dispensing tube is operably connected to a flexible link that is operably connected to a valve in a dispenser by a rigid link. Upon manipulation of the actuating device, the valve is actuated for passing or cutting off fluids from the dispenser to the dispensing tube.

23 Claims, 7 Drawing Sheets

REMOTELY ACTIVATED DISPENSER

BACKGROUND

This invention relates to fluid handling, and more particularly to remotely activated dispensing of chemical solutions from a dispenser.

Systems for dispensing chemical solutions often mix the solutions as needed by adding a concentrated chemical product to a diluent such as water. One type of dispenser uses a mixing device known as an eductor. Eductors siphon the concentrated chemical product into a stream of diluent by passing the diluent through a venturi. In response to diluent flowing through the eductor, the venturi generates suction that draws the concentrated chemical product into the venturi where it mixes with the stream of diluent. The resulting solution flowing out of the eductor may then be dispensed into a container or otherwise provided to a point of use. The mixing and dispensing of the chemical solution is controlled by regulating the flow of diluent through the eductor with a user controlled shut-off valve. Eductors are useful in a number of applications where it is advantageous to allow users to dispense desired amounts of chemical solutions such as diluted cleaning agents.

Eductor-based chemical dispensing systems are typically required to prevent chemical products from being drawn back into the source of diluent to prevent contamination. This is often accomplished by coupling the inlet port of the eductor to the source of diluent using some type of backflow preventer. For example, in what is known as an air gap eductor, the source of diluent flows through a nozzle upstream of the venturi. This nozzle defines a stream of diluent which flows across an unobstructed gap in the eductor body prior to entering the venturi. If there is a loss of pressure at the source of diluent, the stream of diluent terminates, leaving a gap in the eductor between the nozzle and the venturi. This gap prevents any of the chemical product from back-flowing into the source of diluent. Whichever type of backflow preventer is used, the diluent shut-off valve typically must be located upstream of the backflow preventer so the backflow preventer functions properly, and to satisfy regulatory requirements regarding contamination of the diluent source.

Solutions provided by the eductor are typically transported to the point of use through a discharge tube. Because the shut-off valve that controls the dispensing of solutions must be located upstream of the dispenser, and the output end of the discharge tube may be at another location some distance from the dispenser, a system for remotely activating the shut-off valve is normally provided at the output end of the discharge tube. Conventional remote activation systems include a lever located at the output end of the discharge tube that is coupled to the shut-off valve through a system of cables and/or ball chains. However, these systems suffer from various issues such as wear and binding that limit their performance and reliability.

Thus, there is a need for improved devices and methods for remotely actuating shut-off valves in dispensing systems using eductors that provide more reliable and consistent operation of the shut-off valve.

SUMMARY

In an embodiment of the invention, an apparatus for dispensing chemical solutions is provided. The apparatus comprises a dispenser including a shut-off valve and a linkage including a rigid link. The rigid link has a first end coupled to the shut-off valve and a second end opposite the first end. The apparatus further comprises a nozzle assembly including an actuator, and a flexible link including a first end coupled to the actuator of the nozzle assembly and a second end coupled to the linkage. The apparatus is configured so that manipulation of the actuator operates the shut-off valve via the flexible link and the first rigid link.

In another embodiment of the invention, a method of dispensing the chemical solution is provided. The method includes coupling movement of the actuator of the nozzle assembly to a first end of the flexible link, coupling the movement of the first end of the flexible link through the flexible link to a second end of the flexible link, and coupling the movement of the second end of the flexible link to the first end of the rigid link. The movement of the first end of the rigid link is coupled through the rigid link to the second end of the rigid link, and the movement of the second end of the rigid link is coupled to the shut-off valve of the dispenser. The shut-off valve is opened by the movement coupled thereto, thereby causing the dispenser to dispense the chemical solution at the nozzle assembly.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

The present invention provides a dispensing system with an improved remote activation capability for selectively initiating and shutting off the flow of diluent through an eductor. An actuator is provided proximate to the discharge end of a dispensing tube that conveys a chemical solution from a dispenser to a point of use. A flexible link couples the actuator to a linkage at the dispenser. In response to operation of the actuator, the flexible link translates movement of the actuator to the linkage, which in turn actuates the valve to selectively initiate and shut off flow of the diluent through the dispenser. The actuator thereby enables a user to control the flow of solution through the dispensing tube.

Figure 1:
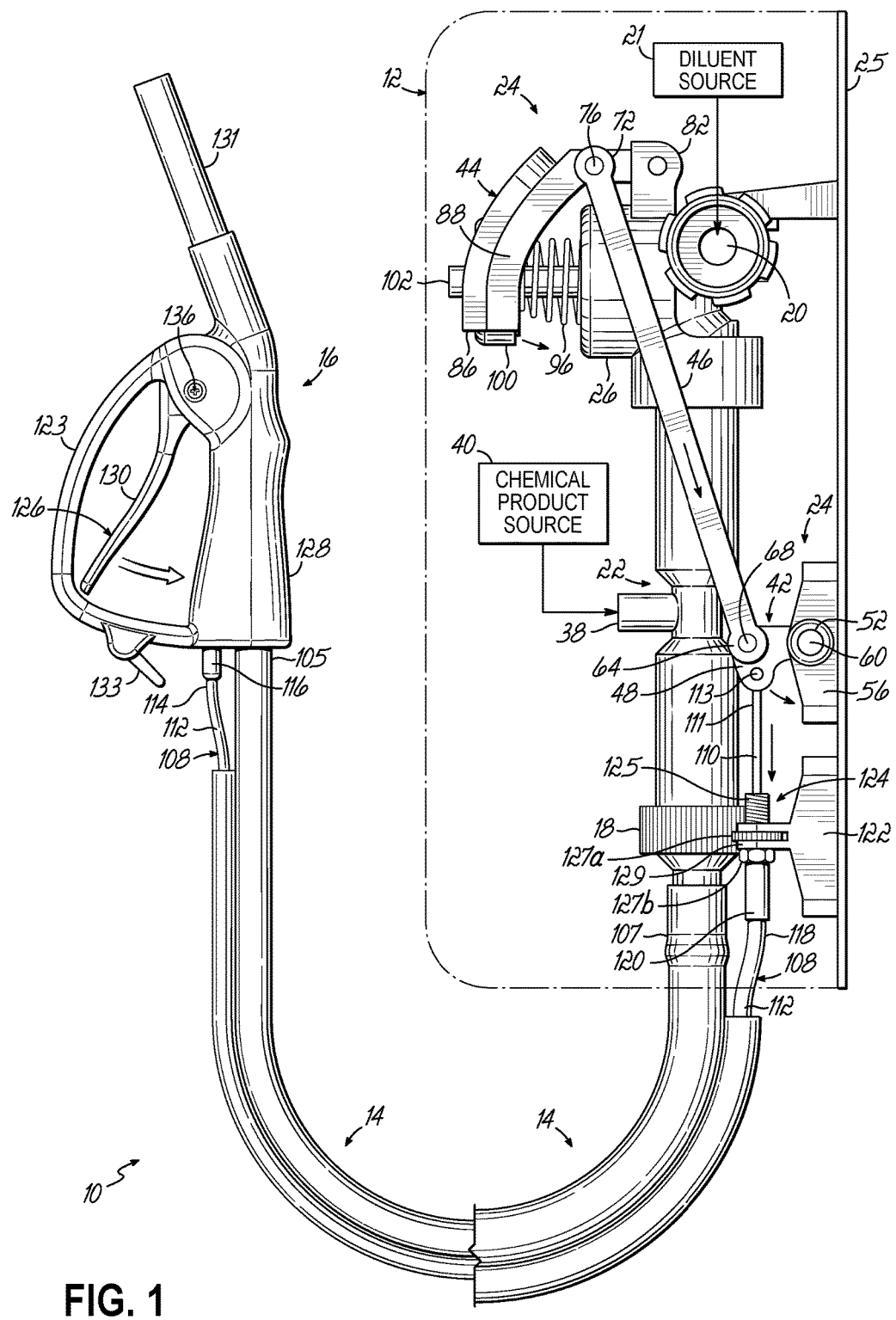
FIG. 1 is a side view of a dispensing system including a dispenser having a shut-off valve in a closed state, and a nozzle assembly coupled to the shut-off valve by a linkage.
Figure 2:
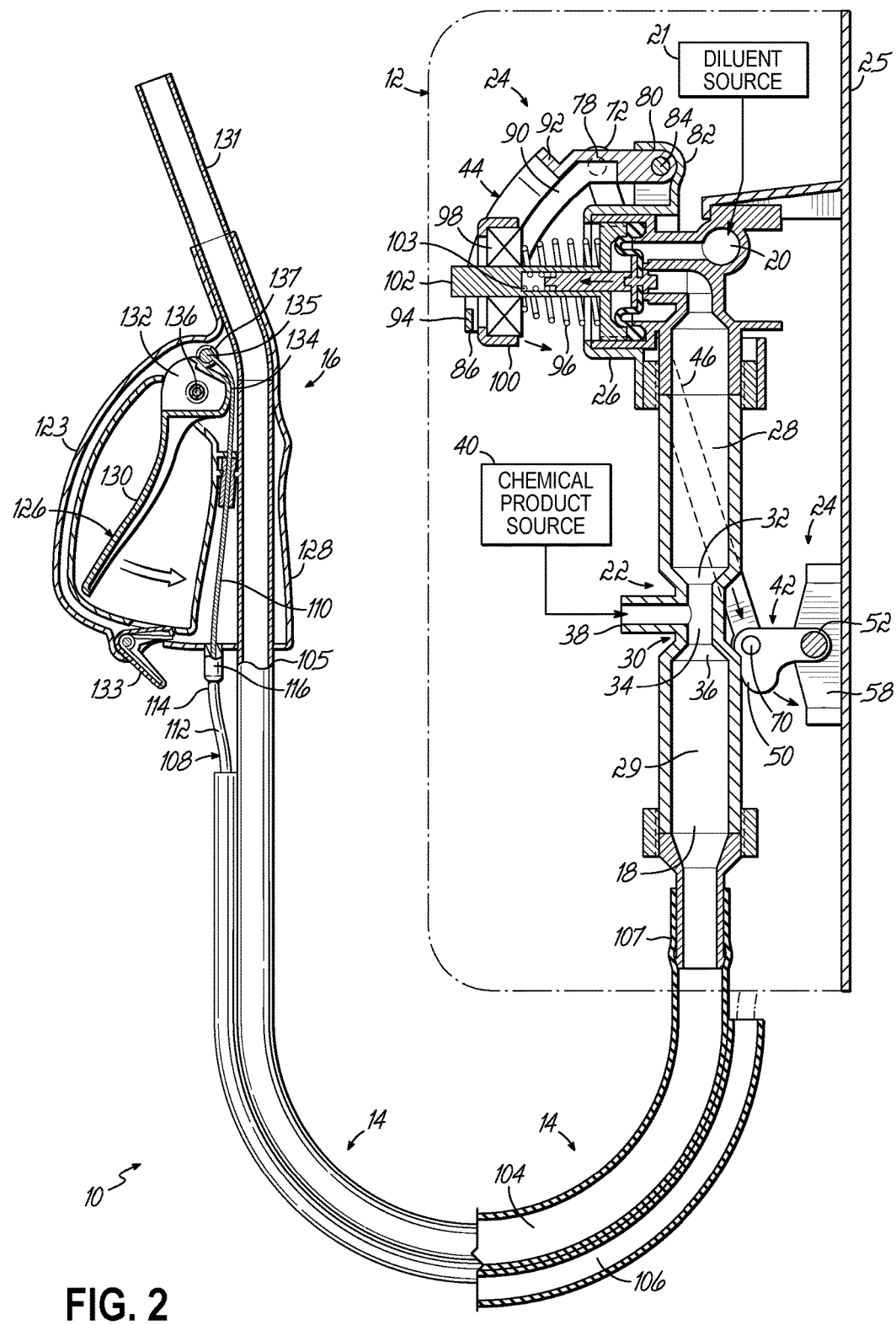
FIG. 2 is a cross-sectional side view of the dispensing system of FIG. 1.
Figure 3:
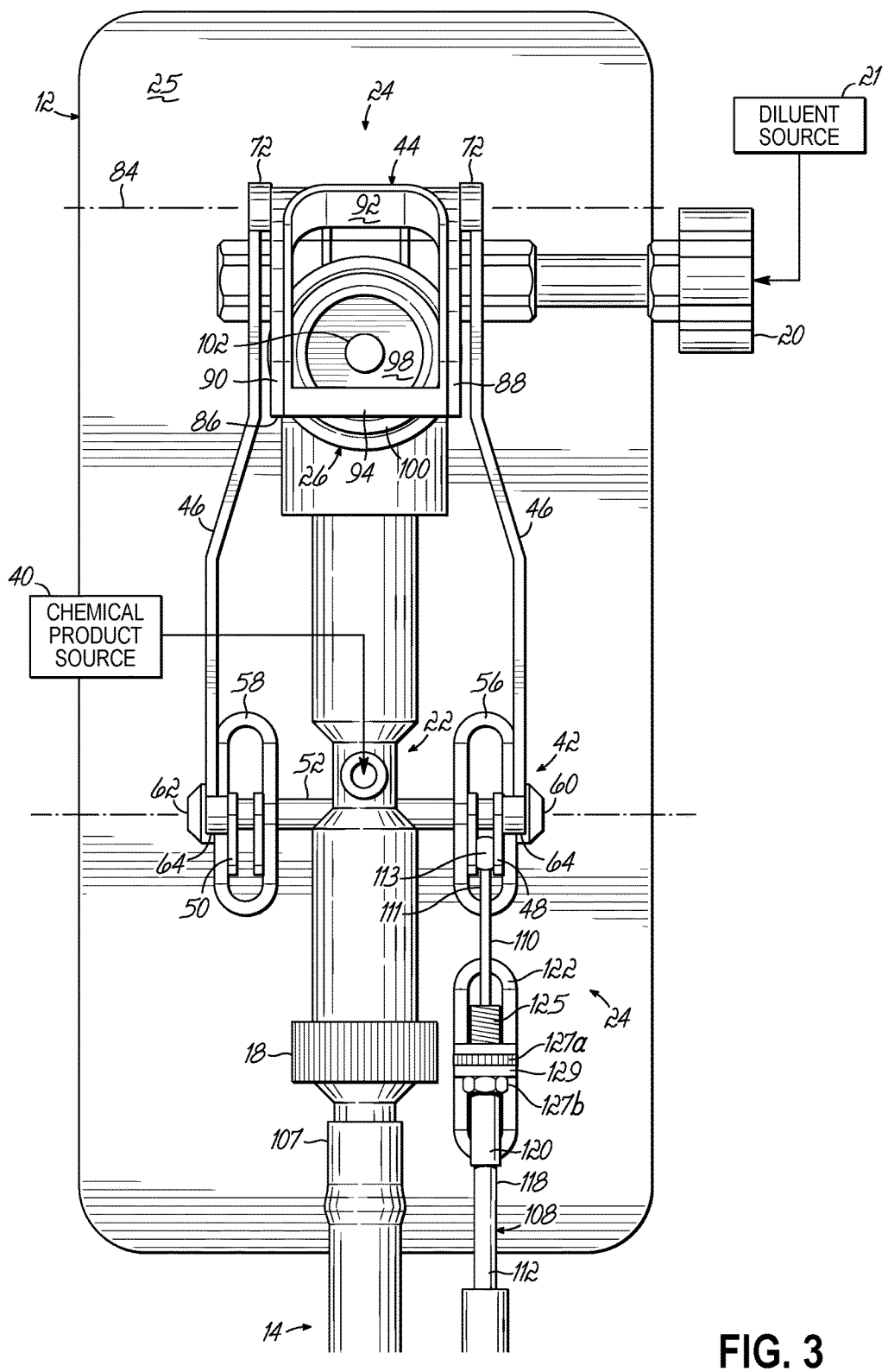
FIG. 3 is a front-view of the dispenser of FIGS. 1 and 2.

FIGS. 1-3 depict a dispensing system 10 in accordance with an embodiment of the invention that includes a dispenser 12, a dispensing tube 14, and a nozzle assembly 16. The dispenser 12 includes an output port 18 that is fluidically coupled to the nozzle assembly 16 by the dispensing tube 14, an input port 20 that may be coupled to a source of diluent 21, an eductor 22, a linkage 24, a frame 25, and a shut-off valve 26 configured to selectively fluidically couple the input port 20 to the eductor 22.

The eductor 22 includes an intake passage 28 that is coupled to an output passage 29 by a venturi 30. The venturi 30 may include a converging passage 32, a throat 34, and a diverging passage 36. The converging passage 32 fluidically couples the intake passage 28 to an upstream end of the throat 34, and the diverging passage 36 fluidically couples the downstream end of the throat 34 to the output passage 29. The throat 34 may be fluidically coupled to a pickup port 38, and has a reduced cross-sectional area as compared to the intake passage 28 and/or output passage 29. The reduced cross-sectional area of the throat 34 may cause the diluent 21 to flow at a higher velocity than in the intake passage 28 and/or output passage 29, thereby generating suction at the pickup port 38. The flow of diluent 21 through the venturi 30 may thereby cause the venturi 30 to draw chemical product from a source of chemical product 40 through the pickup port 38 and into the throat 34 of venturi 30, where the chemical product 40 mixes with the diluent 21.

The exemplary linkage 24 depicted in FIGS. 1-3 includes a rocker arm assembly 42 that is coupled to a lever 44 by one or more (e.g., two) rigid links 46. The rocker arm assembly 42 may comprise one or more (e.g., two) rocker arms 48, 50 and a torsion bar 52. Each rocker arm 48, 50 may be pivotally coupled to a respective rocker arm mount 56, 58 at a central pivot point 60, 62 that is held in a fixed position relative to the frame 25 of dispenser 12 by the rocker arm mount 56, 58. The torsion bar 52 couples the rocker arms 48, 50 so that the rocker arms 48, 50 rotate together about their respective central pivot points 60, 62 thereby distributing rotational force or torque between the rocker arms 48, 50. The rocker arm assembly 42 thereby provides a coupling mechanism within the dispenser 12 that is structurally sound and resistant to deflection.

Each rigid link 46 has a proximal end 64 pivotally coupled to an upper pivot point 68, 70 of its respective rocker arm 48, 50 and a distal end 72 pivotally coupled to an orbiting pivot point 76, 78 of lever 44. The rigid links 46 may thereby be configured to couple movement of the upper pivot point 68, 70 of the rocker arms 48, 50 to the orbiting pivot points 76, 78 of lever 44. In an embodiment of the invention, each of the rigid links 46 may be a molded part that is optimized to translate movement and/or force provided by the rocker arm assembly 42 into movement and/or force at the lever 44. The rigid links 46 may support tighter tolerances than linkages that use ball chains or cables, thereby providing increased reliability and consistency of operation as compared to dispensing systems lacking this feature.

The lever 44 may include a proximal end 80 that is pivotally coupled to an external surface of the shut-off valve 26 by a lever mount 82 at one or more points along a central pivot axis 84. The central pivot axis 84 may be held in a fixed location relative to the shut-off valve 26 by the lever mount 82 to provide a fulcrum for lever 44. The lever 44 may further include a distal end 86 that is coupled to the proximal end 80 by one or more arms 88, 90. The arms 88, 90 of lever 44 may have a curved or angled shape configured to translate rotation of the lever 44 about the central pivot axis 84 into a generally linear movement that opens and closes the shut-off valve 26. The lever 44 may be a single molded part, which may reduce the opportunity for malfunctions or breakage as compared to linkages that use cables or ball chains. The lever 44 and rigid links 46 may also eliminate sawing of cables or ball chains across the body of shut-off valve 26 valve or any other components of the dispenser 12 that could occur in a dispensing system that lacks the rigid links 46.

The orbiting pivot points 76, 78 may be located along their respective arms 88, 90 between the central pivot axis 84 and distal end 86 and of lever 44 so that the movement of the orbiting pivot points 76, 78 about the central pivot axis 84 is multiplied at the distal end 86 of lever 44. The arms 88, 90 may be coupled to each other by a proximal cross-member 92 at or proximate to the proximal end 80 of lever 44, and by a distal cross-member 94 at or proximate to the distal end 86 of lever 44. The distal cross-member 94 may couple the lever 44 to the shut-off valve 26.

Figure 4:
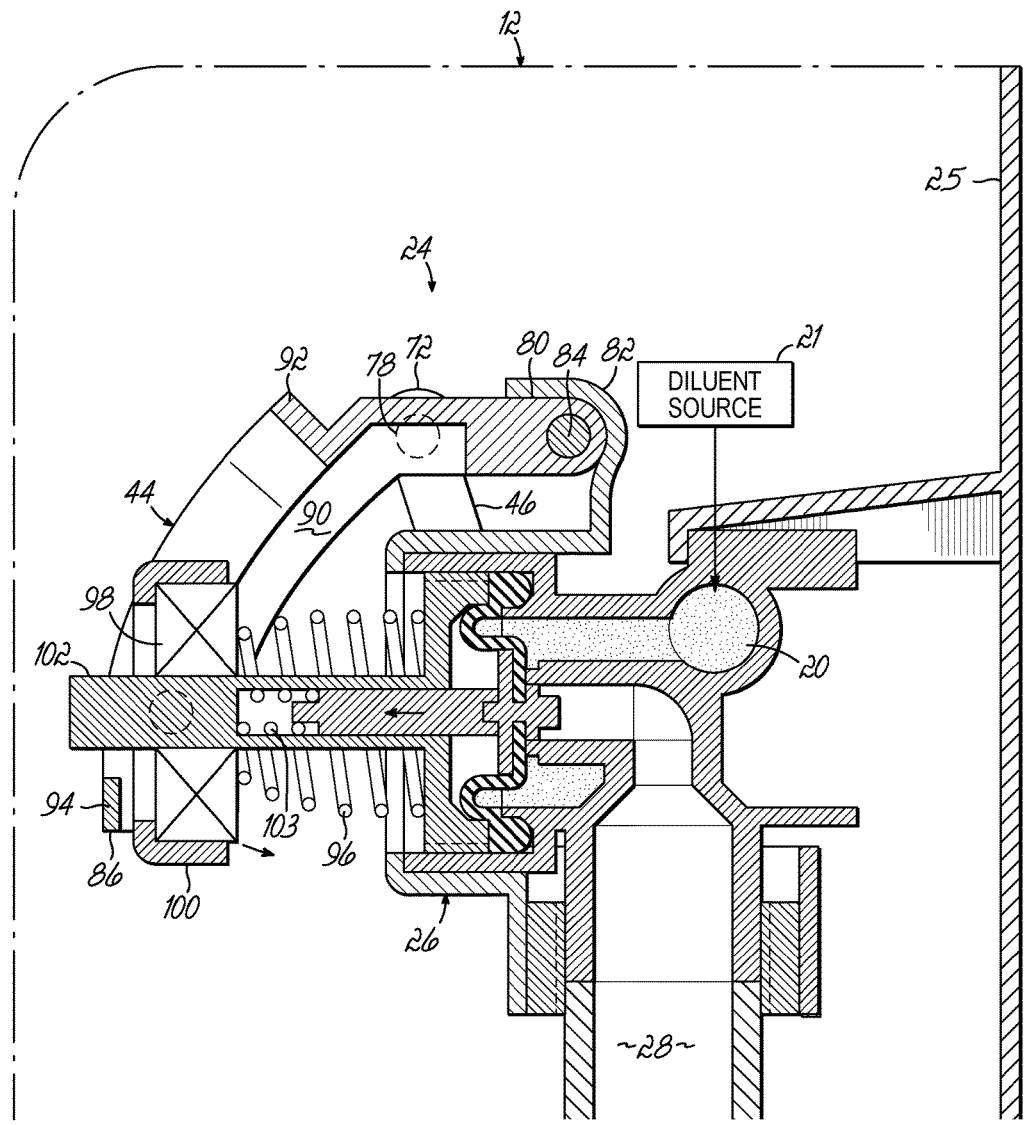
FIG. 4 is a cross-sectional side view of the shut-off valve of FIGS. 1-3.
Figure 7:
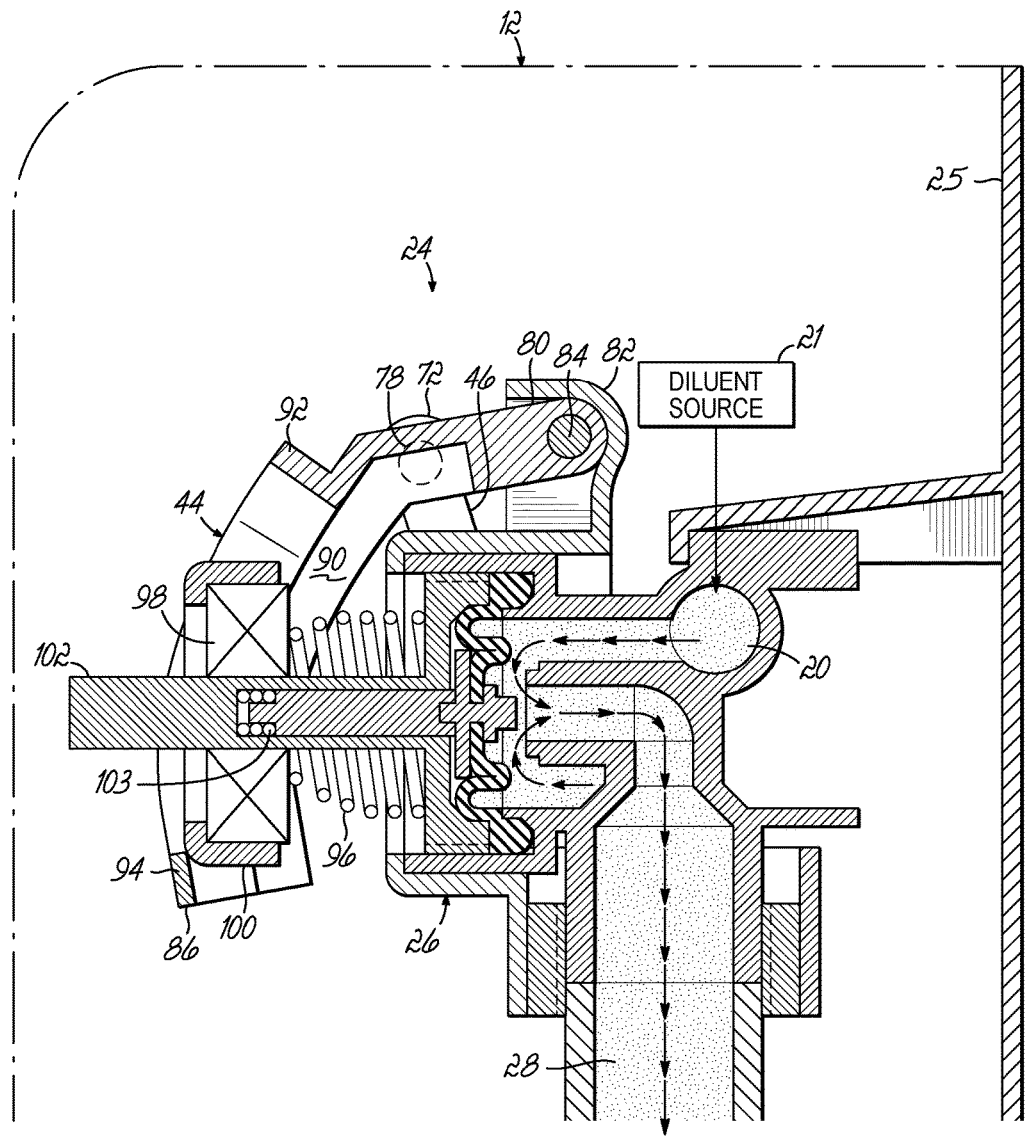
FIG. 7 is a cross-sectional side view of the shut-off valve of FIGS. 5 and 6 in the open state.

Referring now to FIG. 4, and with continued reference to FIGS. 1-3, the shut-off valve 26 may be positioned between the input port 20 of dispenser 12 and the intake passage 28 of eductor 22. The shut-off valve 26 may be a poppet-actuated diaphragm valve that includes an elastic member 96 disposed adjacent to a magnet 98 (e.g., a ring magnet) housed in a magnet cover 100. When the magnet 98 is held by the elastic member 96 in a resting position away from the shut-off valve 26, the shut-off valve 26 may be in a closed position that restricts the flow of diluent 21. When the magnet 98 is moved toward the shut-off valve 26 by the lever 44, the shut-off valve 26 may be actuated into an open position by the magnet 98 so that diluent 21 flows through the shut-off valve 26, as depicted in FIG. 7. The magnet 98 and magnet cover 100 may slide along a valve stem 102 that locates the magnet 98 axially with respect to the shut-off valve 26. Movement of lever 44 may be constrained to prevent the elastic member 96 from urging the magnet 98 beyond the end of the valve stem 102 when the lever 44 is in a relaxed state. Another elastic member 103 may be configured to urge the shut-off valve 26 back into a closed state when the magnet 98 moves away from the shut-off valve 26.

The dispensing tube 14 may include a distal end 105, a proximal end 107, and one or more (e.g., two) passages 104, 106. One of the passages 104 may fluidically couple the output port 18 of dispenser 12 to the nozzle assembly 16, and the other passage 106 may enclose a flexible link 108. The flexible link 108 may be configured to couple mechanical force by movement of an inner member 110 (e.g., a cable) relative to an outer member 112 (e.g., a sheath), or by any other suitable means, such as pneumatic or hydraulic pressure. A proximal end 111 of inner member 110 may be coupled to a lower pivot point 113 of rocker arm 48. A distal end 114 of outer member 112 may include a fitting 116 that couples the outer member 112 to the nozzle assembly 16. A proximal end 118 of outer member 112 may include a fitting 120 that couples the outer member 112 to the frame 25 of dispenser 12. Coupling the proximal end 111 of inner member 110 to the lower pivot point 113 of rocker arm 48 and anchoring the outer member 112 to the frame 25 may allow the flexible link 108 to couple movement of the inner member 110 to the linkage 24.

Locating the flexible link 108 within the passage 106 of dispensing tube 14 may prevent the flexible link 108 from becoming tangled with the dispending tube 14. Entanglement of the flexible link 108 could cause tension in the inner member 110 resulting in unintentional opening of the shut-off valve 26. It should be understood, however, that dispensing tube 14 may comprise a single passage 104 for conveying solutions to the point of use, and the flexible link 108 routed separately along the length of the dispensing tube 14 or connected to the dispenser 12 in another manner.

The fitting 120 of outer member 112 may be coupled to the frame 25 of dispenser 12 by a mount 122 that includes a tension adjustment mechanism 124. In an embodiment of the invention, the tension adjustment mechanism 124 may include a threaded ferrule 125 with two nuts 127a, 127b torqued in opposition against a flange 129 of mount 122. Nut 127b may be a lock nut and nut 127a may be an adjustment nut that allows the position of the flexible link 108 to be adjusted with respect to the mount 122. The adjustment mechanism 124 may thereby be adjusted to hold the flexible link 108 in an appropriate position for actuating the shut-off valve 26. Embodiments using a single lock nut that works in cooperation with a single adjustment nut may provide a simpler design than tension adjustment mechanisms using two lock nuts that must both be loosened to adjust tension.

The nozzle assembly 16 may have a profile with an ergonomic design that results in a comfortable/organic feel in operation. The nozzle assembly 16 may include a trigger guard 123, an actuator 126 comprising a handle 128 and a lever 130 pivotally coupled to the handle 128, and a nozzle 131 configured to dispense solutions, e.g., into a container. The trigger guard 123 may prevent accidental activation of the dispenser 12, e.g., in the event the nozzle assembly 16 is dropped. An elastic member (not shown) may couple the handle 128 to the lever 130 and be configured to urge the lever 130 back into a relaxed state after the lever 130 is released from a compressed or actuated state. The elastic member of nozzle assembly 16 may also reduce the burden on the elastic member 96 of shut-off valve 26.

A spring-loaded latch 133 may be configured to hold the lever 130 in a compressed state so the user is not required to maintain pressure on the lever 130 continuously while dispensing solutions. The spring-loaded latch 133 may be further configured so that when the lever 130 is in an activated state, the spring-loaded latch 133 will release the lever 130 in response to a shock, such as an impact resulting from the nozzle assembly 16 being dropped.

The lever 130 may include a cam 132 to which a distal end 134 of inner member 110 is coupled. The distal end 134 of inner member may include an end cap 135 (e.g., a ball) that is received by a socket 137 of cam 132. The socket 137 may provide a connection point for inner member 110 that is completely captivated. The cam 132 may have a surface configured to support the inner member 110 at a fixed or a variable radius from a pivot point 136 of lever 130. As the lever 130 is squeezed, the cam 132 translates pivoting movement of the lever 130 into linear movement of the inner member 110 relative to the outer member 112 of flexible link 108.

Figure 5:
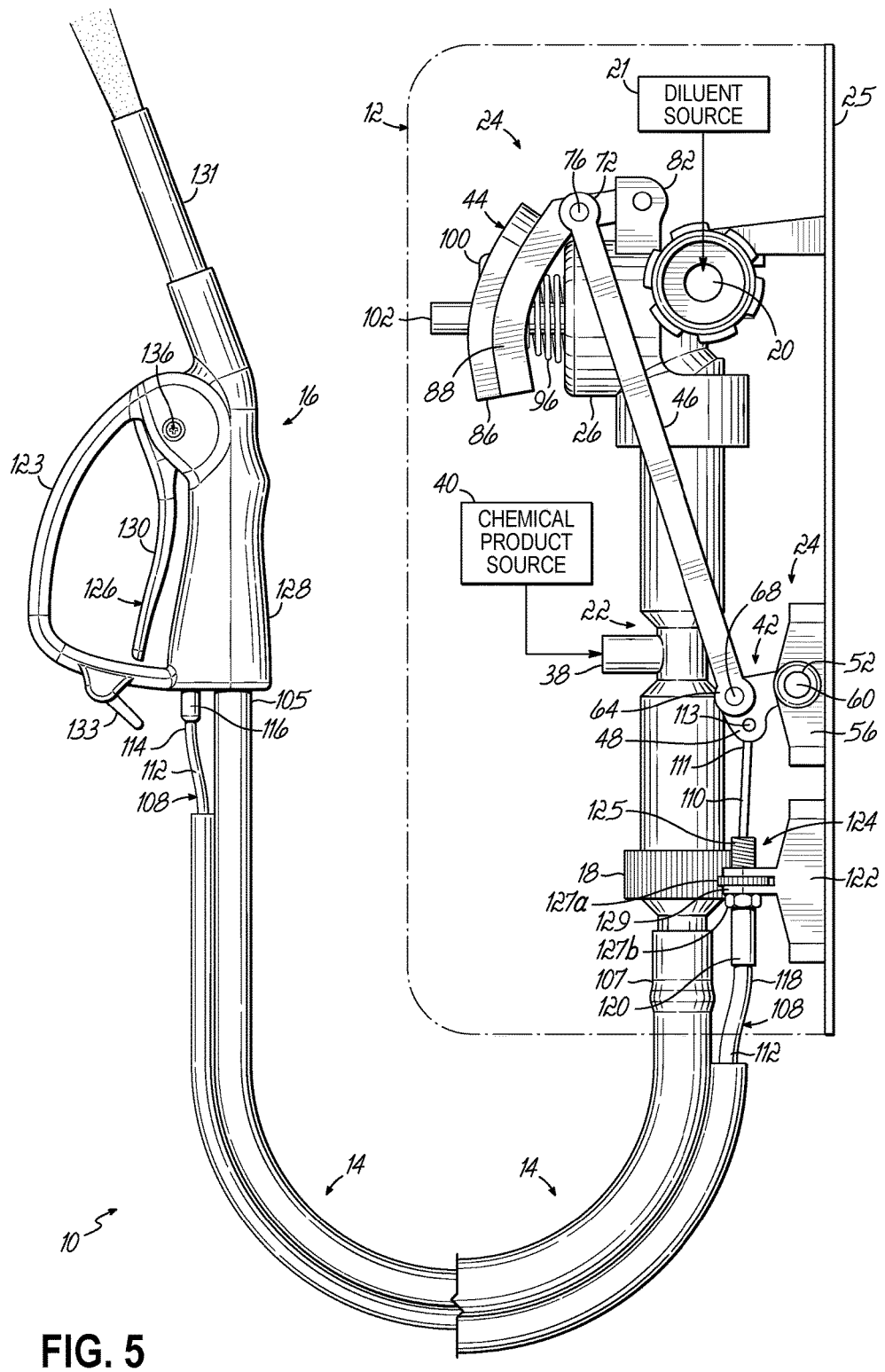
FIG. 5 is a side view of the dispensing system of FIG. 1 showing the shut-off valve held in an open state by the linkage.
Figure 6:
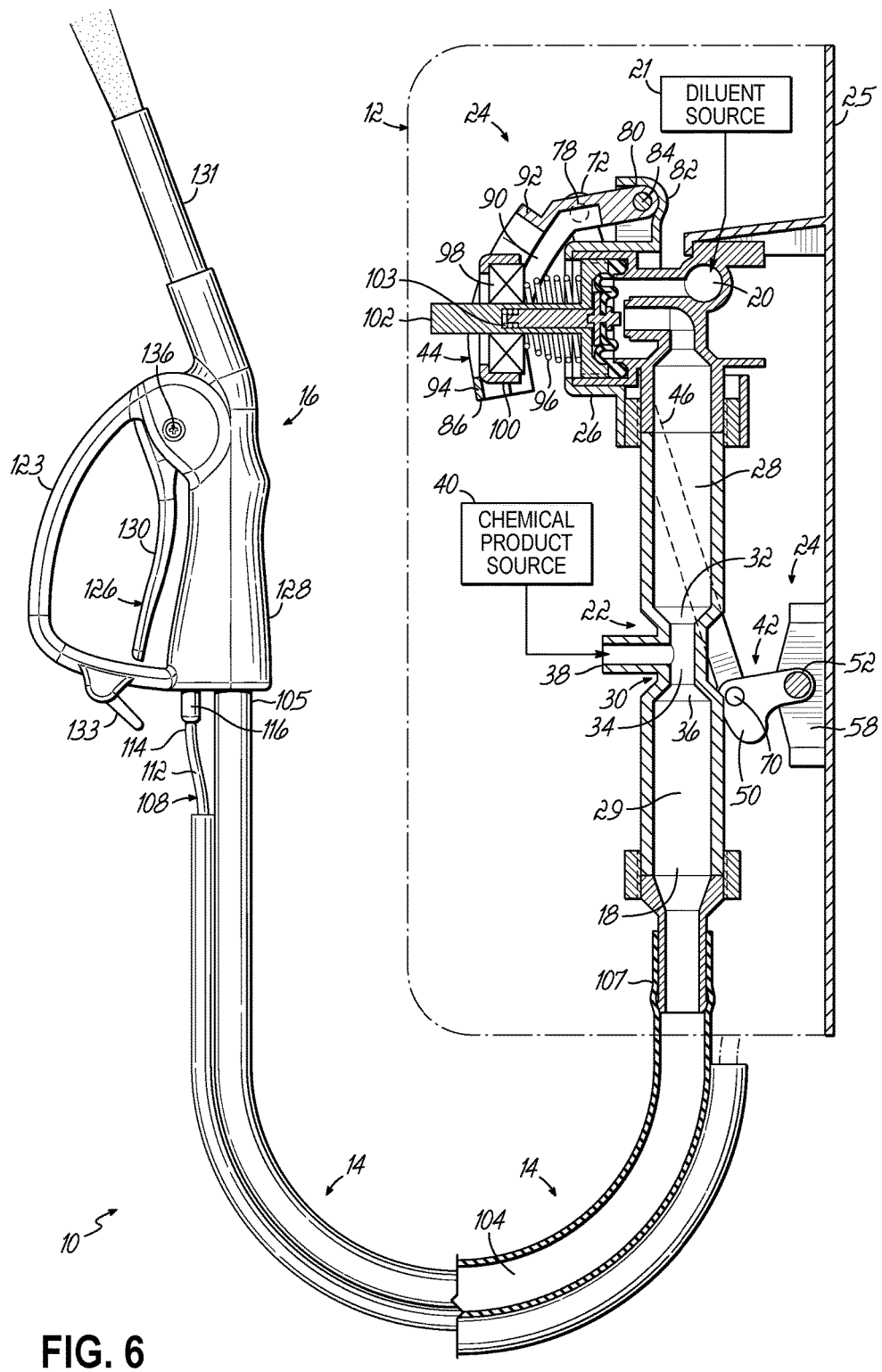
FIG. 6 is a cross-sectional side view of the dispensing system of FIG. 5 with the shut-off valve in the open state.

Referring now to FIGS. 5-7, the application of force to the lever 130 of actuator 126 (e.g., by squeezing the lever 130 against the handle 128) applies a tensile force to the inner member 110 of flexible link 108. This tensile force may be coupled to the lower pivot point 113 of rocker arm 48 by the inner member 110 of flexible link. In response to the application of the tensile force to the lower pivot point 138 of rocker arm 48, the rocker arm assembly 42 may pivot about the central pivot points 60, 62, thereby coupling tensile force through the rigid links 46 to the orbiting pivot points 76, 78 of lever 44. This tensile force may in turn cause the lever 44 to pivot about the central pivot axis 84 so that the lever 44 compresses the elastic member 96 of shut-off valve 26, thereby moving the magnet 98 toward the shut-off valve 26 and causing the shut-off valve 26 to open.

Advantageously, the cam 132 acts as a pulley at the coupling point of the inner member 110, thereby translating rotational motion of the lever 130 into linear movement of the inner member 110. Advantageously, the cam 132 may reduce wear and/or friction as compared to systems that produces a "sawing motion" between a cable and another component of the dispensing system 10. This sawing motion may create a need for frequent cable adjustments to account for changes in the length of the cable due to stretching and/or wear in a surface over which the sawing motion of the cable occurs.

Further advantages may be provided by the captivated end cap 135 of inner member 110. For example, the connection point between the cable and lever in a conventional nozzle assembly is typically a weak point and prone to failure. The captivated end cap configuration may reduce the likelihood of damage to end cap 135 itself, the pivot point 136, and/or the socket 137, thereby increasing the service life and reliability of the nozzle assembly 16 as compared to dispensing systems lacking this feature.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An apparatus for dispensing chemical solutions, comprising:
    a dispenser, comprising:
        a shut-off valve having a closed position and an opened position,
        a linkage including at least one rigid link having a first end and a second end, wherein the first end is operatively coupled to the shut-off valve; and
        at least one rocker arm rotatable about a pivot axis, wherein the second end of the at least one rigid link is coupled to the at least one rocker arm;

a nozzle assembly including an actuator; and
a flexible link including a first end coupled to the actuator of the nozzle assembly and a second end operatively coupled to the at least one rocker arm,
wherein manipulation of the actuator operates to rotate the at least one rocker arm via the flexible link and move the first rigid link to shift the shut-off valve between the closed and opened positions.

2. The apparatus of claim 1 wherein the nozzle assembly includes a nozzle and the dispenser includes an output port, the apparatus further comprising:
a dispensing tube including a first passage that fluidically couples the nozzle to the output port, and a second passage that encloses at least a portion of the flexible link.

3. The apparatus of claim 1 wherein the linkage further comprises:
two rigid links each having the first end operatively coupled to the shut-off valve;
two rocker arms each coupled to respective second ends of the two rigid links; and
a torsion bar having a first end coupled to one of the two rocker arms and a second end coupled to the other of the two rocker arms, wherein the torsion bar is configured to transmit torque between the two rocker arms.

4. The apparatus of claim 3 wherein the linkage further includes:
a lever operatively coupled to the shut-off valve, the lever including a first arm offset to one side of the shut-off valve and a second arm offset to another side of the shut-off valve opposite the one side,
wherein the first end of one of the two rigid links is coupled to the first arm, and the first end of the other of the two rigid links is coupled to the second arm.

5. The apparatus of claim 1 wherein the linkage further comprises:
a lever coupling the first end of the at least one rigid link to the shut-off valve.

6. The apparatus of claim 5 wherein the lever comprises:
a first pivot point located in a fixed position relative to the shut-off valve;
a first end pivotally coupled to the first pivot point;
a second end coupled to the shut-off valve; and
a second pivot point located between the first end of the lever and the second end of the lever that is pivotally coupled to the first end of the at least one rigid link.

7. The apparatus of claim 6 wherein the shut-off valve comprises:
a valve stem;
an elastic member; and
a magnet configured to slide along the valve stem in a first direction in response to urging by the second end of the lever, and in a second direction in response to urging by the elastic member.

8. The apparatus of claim 7 wherein moving the magnet in one of the first direction or the second direction causes the shut-off valve to open and moving the magnet in the other of the first direction or the second direction causes the shut-off valve to close.

9. The apparatus of claim 1, wherein the flexible link includes an outer member and an inner member that moves relative to the outer member in response to manipulation of the actuator.

10. A method of dispensing a chemical solution, comprising:
coupling a movement of an actuator of a nozzle assembly to a first end of a flexible link;
coupling the movement of the first end of the flexible link through the flexible link to a second end of the flexible link;
coupling the movement of the second end of the flexible link to at least one rocker arm rotatable about a pivot axis;
coupling the movement of the at least one rocker arm to a first end of the at least one rigid link;
coupling the movement of the first end of the at least one rigid link through the first rigid link to a second end of the at least one rigid link; and
coupling the movement of the second end of the at least one rigid link to a shut-off valve of a dispenser,
wherein the shut-off valve is opened by the movement of the second end of the at least one rigid link, thereby causing the dispenser to dispense the chemical solution at the nozzle assembly.

11. The method of claim 10 wherein coupling the movement of the actuator to the first end of the flexible link comprises:
translating a pivoting movement of the actuator to a linear movement of the first end of the flexible link.

12. The method of claim 10 wherein coupling the movement of the second end of the flexible link to the first end of the at least one rigid link comprises:
translating a linear movement of the second end of the flexible link to a pivoting movement of the at least one rocker arm; and
translating the pivoting movement of the at least one rocker arm into a linear movement of the at least one rigid link.

13. The method of claim 12 wherein the at least one rocker arm includes a first and second rocker arm and the at least one rigid link includes a first and second rigid link, the method further comprising:
coupling torque caused by the pivoting movement of the first rocker arm to the second rocker arm through a torsion bar.

14. The method of claim 13 further comprising:
translating a pivoting movement of the second rocker arm caused by the torque coupled through the torsion bar into movement of the second rigid link.

15. The method of claim 14 further comprising:
coupling the movement of the first rigid link and the movement of the second rigid link to the shut-off valve through a lever.

16. The method of claim 10 further comprising:
coupling the movement of the at least one rigid link to the shut-off valve through a lever.

17. The method of claim 16 wherein coupling the movement of the at least one rigid link to the shut-off valve through the lever comprises:
pivoting a first end of the lever about a first pivot point in a fixed position relative to the shut-off valve;
coupling a movement of the at least one rigid link to a second pivot point located between the first end of the lever and a second end of the lever; and
coupling the movement of the second end of the lever to the shut-off valve.

18. The method of claim 17 wherein coupling the movement of the second end of the lever to the shut-off valve comprises:
coupling the movement of the second end of the lever to a magnet configured to slide along valve stem of the shut-off valve in a first direction in response to urging by the movement and in a second direction along the valve stem in response to urging by an elastic member.

19. The method of claim 18 wherein moving the magnet in one of the first direction or the second direction causes the shut-off valve to open, and moving the magnet in the other of the first direction or the second direction causes the shut-off valve to close.

20. An apparatus for dispensing chemical solutions, comprising:
 a dispenser, comprising:
  a shut-off valve having a closed position and an opened position;
  a linkage including at least one rigid link having a first end and a second end;
  a lever rotatable about a pivot axis, wherein the lever is operatively coupled to the shut-off valve, and wherein a first end of the at least one rigid link is coupled to the lever;
 a nozzle assembly including an actuator; and
 a flexible link including a first end coupled to the actuator and a second end operatively coupled to the second end of the at least one rigid link,
 wherein manipulation of the actuator operates to move the at least one rigid link via the flexible link and rotate the lever to shift the shut-off valve between the closed and opened positions.

21. A method of dispensing a chemical solution, comprising:
 providing an apparatus having a nozzle assembly with an actuator, a dispenser remote from the nozzle assembly, a flexible link extending between the actuator and dispenser, and a dispensing tube extending between the nozzle assembly and the dispenser, the dispenser including a shut-off valve having a closed and opened position, and a linkage having at least one flexible link operatively coupled to the shut-off valve;
 manipulating the actuator;
 pulling the flexible link as a result of manipulating the actuator; and
 transforming the pulling of the flexible link into rotary movement to moves the at least one rigid link,
 wherein the movement of the rigid link moves the shut-off valve between the closed and opened positions.

22. The method of claim 21, wherein transforming the pulling of the flexible link into rotary movement further comprises rotating at least one rocker arm operatively coupled to the flexible link, the at least one rocker arm being operatively coupled to the at least one rigid link.

23. The method of claim 21, wherein transforming the pulling of the flexible link into rotary movement further comprises rotating a lever operatively coupled to the shut-off valve, wherein the at least one lever is operatively coupled to the at least one rigid link, and the at least one rigid link is operatively coupled to the flexible link.

* * * * *